UNITED STATES PATENT OFFICE.

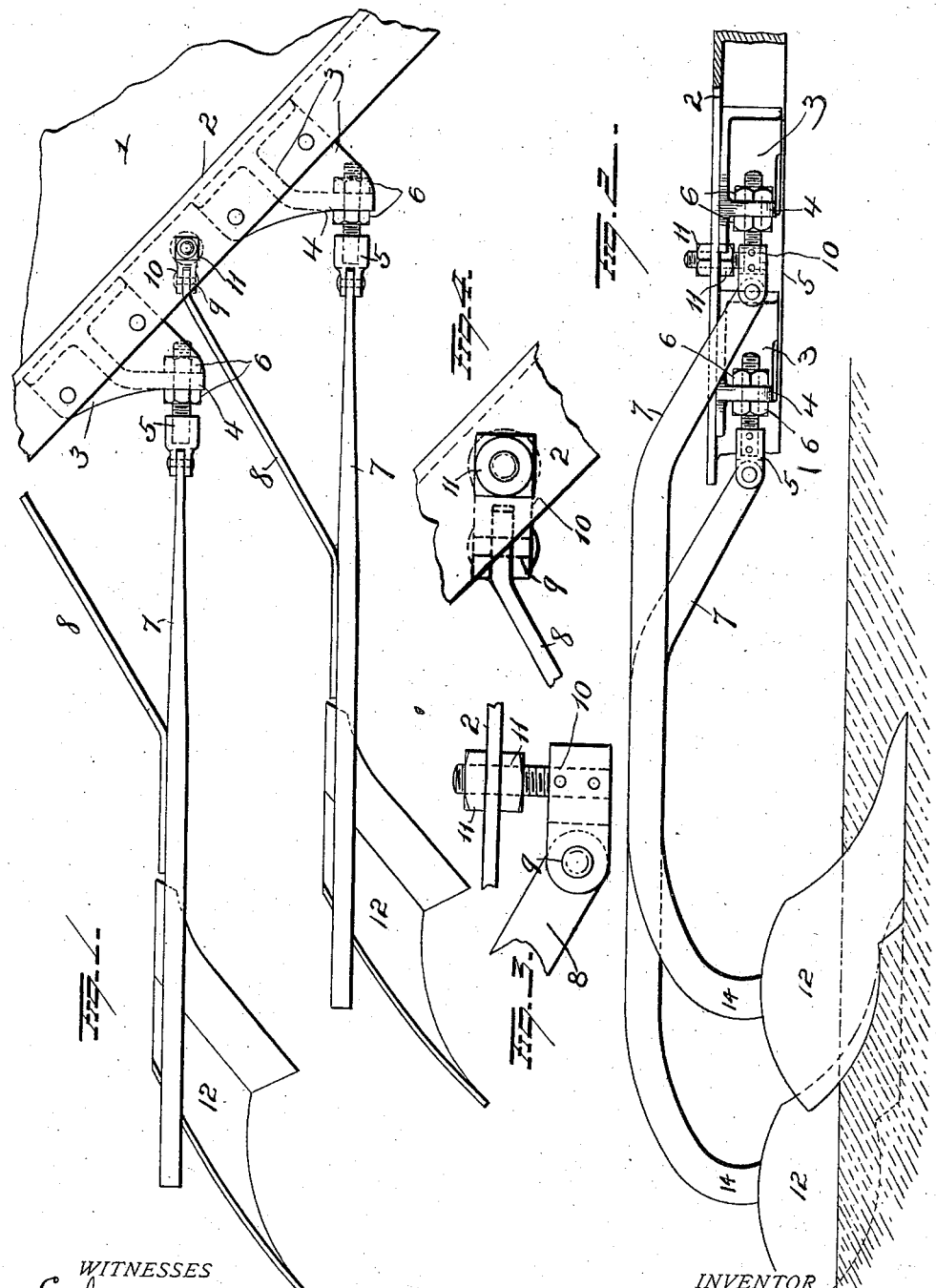

WILLIAM L. PAUL, OF SOUTH BEND, INDIANA, ASSIGNOR TO OLIVER CHILLED PLOW WORKS, OF SOUTH BEND, INDIANA.

ENGINE GANG-PLOW.

1,073,361.  Specification of Letters Patent.  Patented Sept. 16, 1913.

Original application filed June 11, 1910, Serial No. 566,417. Divided and this application filed December 31, 1910. Serial No. 600,354.

*To all whom it may concern:*

Be it known that I, WILLIAM L. PAUL, of South Bend, in the county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in plows and more particularly to those of the engine gang type,—this application being a division of application filed by me June 11th, 1910, and designated by Serial Number 566,417.

The object of my present invention is to afford easy and efficient means for adjusting the positions of the soil engaging members and for adjusting the distance between the same.

With this object in view the invention consists in certain novel features of construction and combinations of parts as hereinafter set forth and pointed out in the claims.

In the accompanying drawings, Figure 1 is a plan view. Fig. 2 is a side elevation, and Figs. 3 and 4 are detail views, in side elevation and plan respectively, illustrating the knuckle 10.

1 represents a portion of a truck frame such as commonly employed with engine gang plows and is provided with a diagonal rear edge to which an angle-beam 2 is secured. Brackets 3 are secured at intervals to the angle-beam 2 and each bracket is provided with a vertical flange 4. The threaded member of a knuckle 5 is passed through a suitable hole in the flange 4 and held adjustably in position by means of nuts 6. The forward end of a plow beam 7 is pivotally connected with the rear end of each knuckle 5 in such manner as to permit vertical movement of the rear end of said plow beam. A laterally projecting brace 8 is secured to an intermediate portion of each plow beam and at its forward end, said brace is pivotally connected, as shown at 9 Fig. 1, to a vertically adjustable knuckle 10,—the threaded member of which latter passes through one of the flanges of the angle-beam 2 and is adjustably secured thereto by means of nuts 11. A soil engaging member 12 is provided at the rear end of each plow beam and connected with the latter through the medium of a suitable standard 14. By connecting the forward end of the plow beam with the truck frame through the medium of the longitudinally adjustable knuckle 5, I am enabled to regulate the angular relation of the plow to the frame, thereby changing or adjusting the distances between the various plows. With the use of the vertically adjustable knuckle with which the brace 8 from the plow beam is connected, I am enabled to level a plow relatively to the frame and to the other plows of the series.

Having fully described my invention what I claim as new and desire to secure by Letters-Patent, is,—

1. In a plow, the combination with a draft frame, of a trailing plow and a connection between said plow and said frame comprising a substantially horizontal axis, adjustable means for tilting said axis and means adjustable parallel to the line of draft for angling said axis horizontally.

2. In a plow, the combination with a draft frame, of a trailing plow and a connection between said plow and said frame comprising a substantially horizontal axis, adjustable means for moving one end of said axis vertically, and adjustable means for moving one end of said axis substantially parallel to the line of draft.

3. In a plow structure of the character described, the combination with a traveling member and a plurality of plows, of connecting devices to which said plows are pivotally attached, and means affording adjustment of said connecting devices parallel to the axes of the plows and also in a direction at right angles to the axes of the plows.

4. In a plow structure of the character described, the combination with a traveling member and a plurality of plows, of two connecting devices with which each plow is pivotally connected, means adjustable parallel with the axes of the plows connecting one of said connecting devices with the traveling member, and means adjustable vertically at right angles to the axes of the plows connecting the other of said connecting devices with said traveling member.

5. In a plow structure of the character described, the combination with a traveling member and a plow beam, of two knuckles to which said plow beam is pivotally attached, means adjustable parallel to the axis of the beam connecting one of said knuckles with said traveling member, and means adjustable vertically at right angles to the axis of the plow beam connecting the other knuckle with said traveling member.

6. In a plow structure of the character described, the combination with a traveling member having a diagonal rear end, a plow beam, and a brace projecting forwardly and laterally from said plow beam, of means adjustable parallel to the axis of the plow beam and affording a pivotal connection of the plow beam with the traveling member, and means adjustable vertically at right angles to the axis of the plow beam and affording pivotal connection of the brace with a traveling member, the pivotal connections of the plow beam and brace being in approximate horizontal alinement with each other.

7. In a plow structure of the character described, the combination with a traveling member and a plurality of plows, each provided with a laterally and forwardly projecting brace, of an angle beam secured to said traveling member at an angle to the direction of travel thereof, a bracket for each plow secured to said angle beam, a knuckle attached to each bracket and having pivotal connection with a plow beam and adjustable parallel to the axis of the latter, and a knuckle for each brace adjustable vertically at right angles to the axes of the plows and attached to said angle-beam, said last-mentioned knuckle having pivotal connection with the adjacent plow brace.

In testimony whereof, I have signed this specification in the presence of two subscribing witnesses.

WILLIAM L. PAUL.

Witnesses:
 DONALD A. HIMES,
 EDWIN NICAR.

---

Copies of this patent may be obtained for five cents each, by addressing the "Commissioner of Patents, Washington, D. C."